US006820762B2

(12) United States Patent
Berg, Sr.

(10) Patent No.: US 6,820,762 B2
(45) Date of Patent: Nov. 23, 2004

(54) HIGH STRENGTH RIB FOR STORAGE TANKS

(75) Inventor: Robin L. Berg, Sr., Hudson, WI (US)

(73) Assignee: Xerxes Corporation, Minneapolis, MN (US)

( * ) Notice: Subject to any disclaimer, the term of this patent is extended or adjusted under 35 U.S.C. 154(b) by 0 days.

(21) Appl. No.: 10/036,423

(22) Filed: Jan. 7, 2002

(65) Prior Publication Data

US 2003/0127460 A1 Jul. 10, 2003

(51) Int. Cl.[7] ................................................ B65G 88/06

(52) U.S. Cl. ................................ 220/560.03; 220/567.2

(58) Field of Search ........................... 220/567.1, 567.2, 220/560.03, 576.1; 52/223.2, 223.1, 223.3

(56) References Cited

U.S. PATENT DOCUMENTS

| | | | | | |
|---|---|---|---|---|---|
| 372,487 | A | * | 11/1887 | Purves | 72/252.5 |
| 1,086,295 | A | * | 2/1914 | Hillman | 52/223.3 |
| 1,167,159 | A | * | 1/1916 | Flannery | 138/105 |
| 1,497,141 | A | * | 6/1924 | Hart | 52/248 |
| 2,269,617 | A | * | 1/1942 | Borstel | 220/654 |
| 2,866,674 | A | * | 12/1958 | Hamlin | 277/436 |
| 3,124,001 | A | * | 3/1964 | Conley | 73/322.5 |
| 3,614,114 | A | * | 10/1971 | Traub | 277/589 |
| 3,893,786 | A | * | 7/1975 | Rahnke et al. | 415/178 |
| 4,155,207 | A | * | 5/1979 | Humphrey | 52/248 |
| 4,739,659 | A | | 4/1988 | Sharp | |
| 4,875,361 | A | | 10/1989 | Sharp | |
| 4,925,046 | A | | 5/1990 | Sharp | |
| 4,948,007 | A | | 8/1990 | Berg et al. | |
| 4,958,957 | A | | 9/1990 | Berg et al. | |
| 4,974,739 | A | | 12/1990 | Gelin | |
| 4,989,447 | A | | 2/1991 | Gelin | |
| 5,017,044 | A | | 5/1991 | Sharp | |
| 5,020,358 | A | | 6/1991 | Sharp | |
| 5,186,217 | A | * | 2/1993 | Kallinich et al. | 138/149 |
| 5,220,823 | A | | 6/1993 | Berg et al. | |
| 5,522,340 | A | | 6/1996 | Skogman | |
| 5,544,974 | A | | 8/1996 | Berg et al. | |
| 5,549,360 | A | * | 8/1996 | Lipeles | 301/64.703 |
| 5,595,456 | A | | 1/1997 | Berg et al. | |
| 5,645,231 | A | | 7/1997 | Smith | |
| 5,651,474 | A | * | 7/1997 | Callaghan et al. | 220/565 |
| 5,720,404 | A | | 2/1998 | Berg et al. | |
| 5,803,304 | A | | 9/1998 | Berg | |
| 6,161,493 | A | | 12/2000 | Berg, Sr. | |
| 6,167,608 | B1 | | 1/2001 | Burwell et al. | |
| 6,280,614 | B1 | | 8/2001 | Berg et al. | |
| 6,510,961 | B1 | * | 1/2003 | Head et al. | 220/645 |

FOREIGN PATENT DOCUMENTS

| | | | |
|---|---|---|---|
| DE | 197 32 285 | * | 7/1997 |
| DE | 197 32 285 | * | 1/1999 |

* cited by examiner

*Primary Examiner*—Joseph C. Merek
(74) *Attorney, Agent, or Firm*—Piper Rudnick LLP; Steven B. Kelber

(57) ABSTRACT

A rib suitable for use with a storage tank has a "Y" cross sectional shape including a trunk section and branches. Each of the branches includes a substantially flat upper surface for positioning adjacent to a tank wall. The branches together with the tank wall define an annular space which may be used as part of an annular space in a multiple wall tank. The rib preferably includes a high modulus material such as graphite or steel. The high modulus material may be present in the trunk, branches, or both.

35 Claims, 7 Drawing Sheets

HIGH STRENGTH RIB FOR STORAGE TANKS

BACKGROUND OF THE INVENTION

1. Field of the Invention

The invention relates to storage tanks generally, and more particularly to a high strength rib that can be used in a double-walled storage tank.

2. Discussion of the Background

Underground storage tanks are commonly used for the storage of liquids, particularly gasoline and other petroleum products. These tanks are generally cylindrical in shape, with either curved (e.g. hemispherical) or flat ends. Underground storage tanks may be made of many materials, including steel and fiber reinforced plastic (referred to herein as FRP and fiberglass). These tanks may be single, double, or multi-walled. Double or multi-walled tanks are required by many municipalities in situations in which gasoline or other environmentally harmful materials are stored in the tanks. As used herein, a 'double walled tank' is a term of art that refers to a tank that includes an inner wall, an outer wall and an annular space between the inner and outer walls. The annular space in such tanks is generally used to monitor the inner and outer walls of the tank for cracks and other damage. Known monitoring systems include wet, dry, pressure and vacuum systems. All of these systems are well known in the art and will not be discussed in further detail herein.

Because these tanks are underground, they are subjected primarily to compressive forces exerted on the tank by the surrounding fill (sand, pea gravel, or the like). These forces can be even greater when an underground storage tank is installed at a location such as a service station where vehicles may drive over the tank.

In order to provide underground storage tanks with sufficient structural strength to withstand these compressive forces, ribs are often provided with the tank. These ribs may be integral; that is, they are formed in the tank wall. Forming integral ribs presents some challenges. First, forming internal integral ribs is difficult using male molding technology since a collapsible mandrel is required. Second, when integral ribs are made from the same material as the tank walls, the ribs are limited in their specific strength.

What is needed is a high strength rib and an underground storage tank that incorporates such a rib that can be easily and inexpensively manufactured.

SUMMARY OF THE INVENTION

The present invention meets the aforementioned need to a great extent by providing a high strength rib featuring a "Y" cross sectional shape and high modulus reinforcing material such as steel or graphite in the body of the rib. The present invention also provides a method for manufacturing a double walled underground storage tank using the high strength rib as well as a method for manufacturing the rib itself.

In one aspect of the invention, the "Y" cross sectional shape of the rib provides a channel between the branches of the "Y". This channel may be used as part of an annular monitoring space in a double walled or multiple walled tank.

In another aspect of the invention, the rib may be manufactured separately from the tank and installed on the interior of the tank after the tank has been completed. This allows the construction of an internally ribbed tank using a male mold without the necessity of providing a collapsible mandrel.

In another aspect of the invention, the rib may be manufactured separately from the tank and installed on the exterior of the tank after the tank has been completed. Alternatively, the rib may be formed integrally with an outer wall after the tank, In still another aspect of the invention, a method of manufacturing such a high strength rib employs a rotating cylindrical male mold having a helical channel with a "Y" cross sectional shape, the trunk of the "Y" being at the bottom of the channel and the branches of the "Y" being at the top of the channel (the outermost surface of the cylindrical male mold). While the cylindrical mold rotates, material such as fiberglass is deposited into the channel. This material may include high modulus materials such as graphite elements and/or metal reinforcing rods, which are preferably placed in the trunk section of the "Y" shaped channel. When the channel has been filled and any necessary drying/curing has completed, the material in the channel is cut in a direction transverse to the channel along the length of the cylindrical mold such that individual sections of the material can be removed from the mold and be made into hoops (with an outside diameter equal to the inside diameter of the tank) by attaching the cut ends of a section to each other. Preferably, to facilitate installation into a tank, the cut ends are not attached until the rib has been positioned at a desired location inside the tank. Additional materials may then be deposited over the rib and interior tank wall to secure the rib to the tank wall.

In one preferred embodiment of a fiberglass underground storage tank incorporating the high strength rib, an outer wall is constructed using a female mold. After the outer wall has cured, a plastic film such as Mylar® is placed over the inside surface of the outer wall, including areas where ribs are to be installed. Plastic films such as Mylar® will allow fluids to flow between two tank walls that are separated by such a film, as discussed in commonly owned U.S. Pat. No. 5,720,404, the contents of which are incorporated by reference herein. In alternative embodiments, a three dimensional distance fabric, which is preferably loadtransmitting, that allows the passage of fluids therethrough, may be used in place of or in combination with the film. (In still other embodiments, the surface of the walls may be manufactured with protrusions that creates spaces between the walls through which fluid may pass even when walls are adjacent to each other.) Ribs are then placed over the film or distance fabric. Next, an inner wall is layed up over the film or material and ribs. If a third or more walls are required, an additional layer(s) of film/fabric and an additional wall may be formed over the aforementioned structure.

In another preferred embodiment of the invention, the branches of a "Y" shaped rib have a top portion with a width less than a specified maximum thickness. This allows the rib to be attached directly to the inside surface of the outer wall. A plastic film or distance fabric is then placed over the portions of the inside surface not covered by the ribs such that the film/fabric abuts the outside surfaces of the branches of the "Y" shaped rib. Along one or more discrete regions along the circumference of the tank, a gutter (a channel formed between the inner and outer walls) is formed along the length of the tank and is in fluid communication with both the annular spaces formed on the inside of the branches of the "Y" shaped rib and the outer wall and the annular spaces formed by the film/fabric between ribs. This arrangement ensures that a single annular space is present everywhere between the inner and outer walls, save for those points at which the branches of the "Y" shaped rib are attached to the outer wall. As the thickness of the branches of the “Y” shaped rib are less than the maximum allowable distance at all of these points, the aforementioned double wall tank requirement is met. In situations where no point through which a line may pass at an angle normal to the outer surface of the tank without passing through an annular space is allowed, the film or material may be extended up over the branches of the “Y” shaped rib such that the ends of the film/material extend past the point at which the branches are attached to the tank wall.

BRIEF DESCRIPTION OF THE DRAWINGS

A more complete appreciation of the invention and many of the attendant features and advantages thereof will be readily obtained as the same become better understood by reference to the following detailed description when considered in connection with the accompanying drawings, wherein.

DETAILED DESCRIPTION OF THE PREFERRED EMBODIMENTS

The present invention will be discussed with reference to preferred embodiments of high strength ribs and tanks incorporating such ribs as well as methods of manufacturing the same. Specific details, such as the number of ribs, materials, and dimensions of the ribs and tanks, are set forth in order to provide a thorough understanding of the present invention. The preferred embodiments discussed herein should not be understood to limit the invention.

Figure 1:
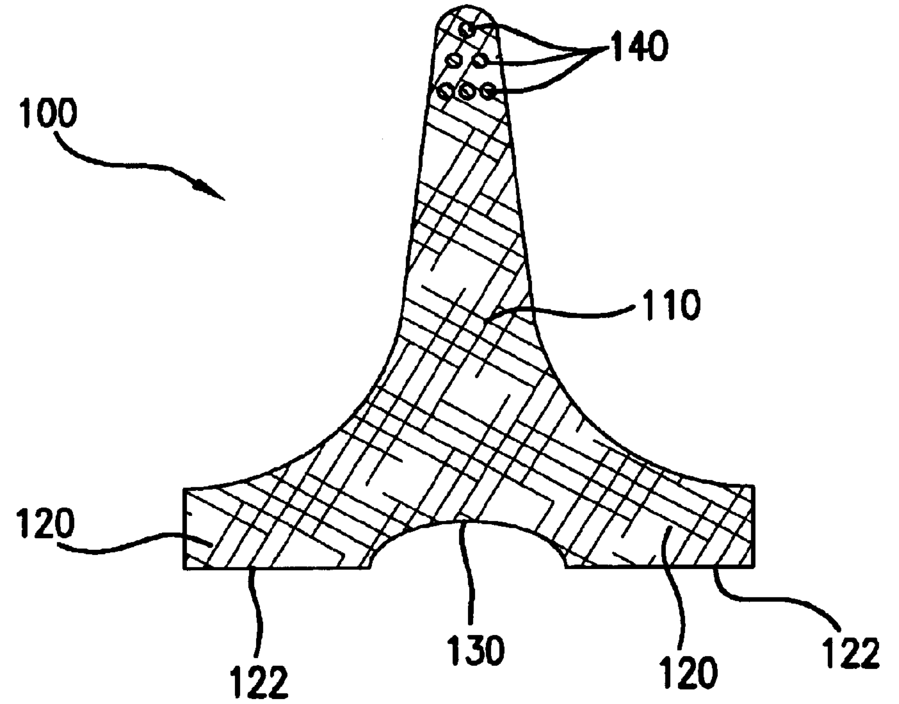
FIG. 1 is a cross sectional view of a rib according to a first embodiment of the present invention.

Referring now to the drawings, wherein like reference numerals designate identical or corresponding parts throughout the several views, a cross sectional view of a high strength rib 100 including a trunk section 110 and branches 120 is shown in FIG. 1. Each of the branches 120 includes a substantially flat upper surface 122 which will be positioned adjacent to a tank wall as described in further detail below. The rib 100 is preferably comprised of fiberglass, but other materials may also be used as is well known in the art. Located in the trunk 110 are a plurality of reinforcing members 140. In preferred embodiments, the reinforcing members 140 comprise a high modulus material (relative to the material comprising the remainder of the rib) such as graphite, steel, high modulus fiberglass, boron, titanium, or other material. In one highly preferred embodiment, reinforcing bars (sometimes referred to as rebar) such as the reinforcing bars commonly used with concrete, are used as the high modulus material. The rib 100 also includes a cavity 130 formed by the branches 120. The cavity 130 serves two purposes. First, it conserves material. Second, it may form part of an annular space when used in multi-walled tanks.

Figure 2:
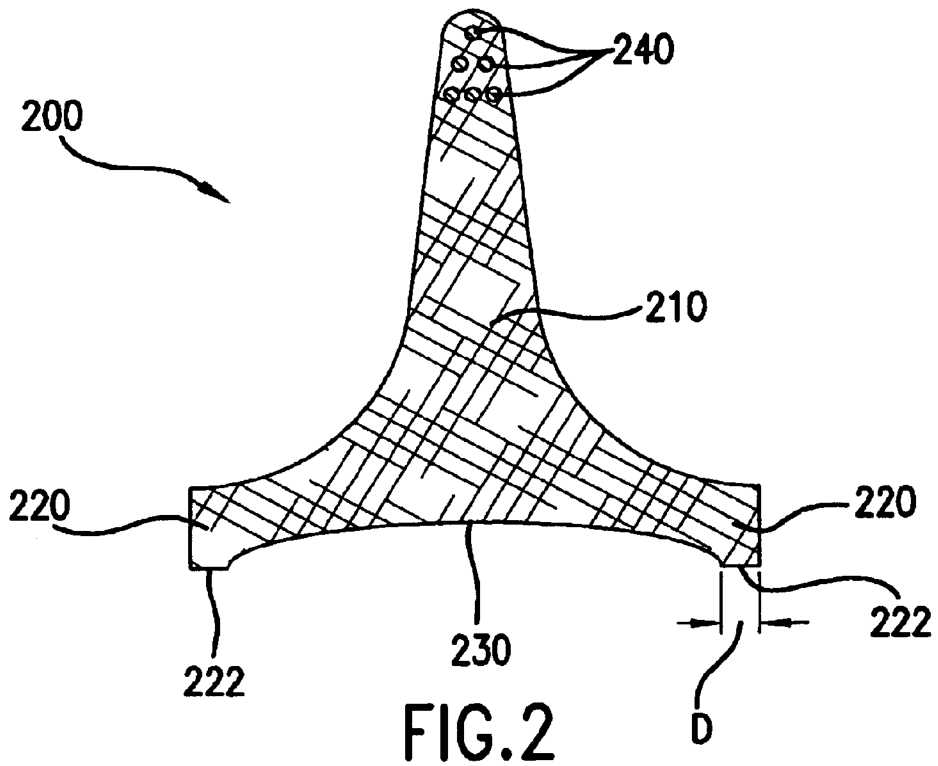
FIG. 2 is a cross sectional view of a rib according to a second embodiment of the present invention.

Another embodiment of a rib 200 is illustrated in FIG. 2. The chief difference between the rib 200 and the rib 100 of FIG. 1 is that the rib 200 of FIG. 2 includes a much wider cavity 230. The width of the cavity 230 results in each of the branches 220 having an upper surface 222 of a width D which is much smaller than the width of the upper surfaces 122 of the rib 100. This arrangement is especially useful in applications in which regions with a thickness less than a specified maximum that do not meet the ‘normal line’ requirement discussed above are allowed. In such applications, the width D of the upper surface 222 is set to less than the specified maximum. As in the embodiment shown in FIG. 1, the rib 200 may include reinforcing members 240 in the trunk 210.

Figure 3:
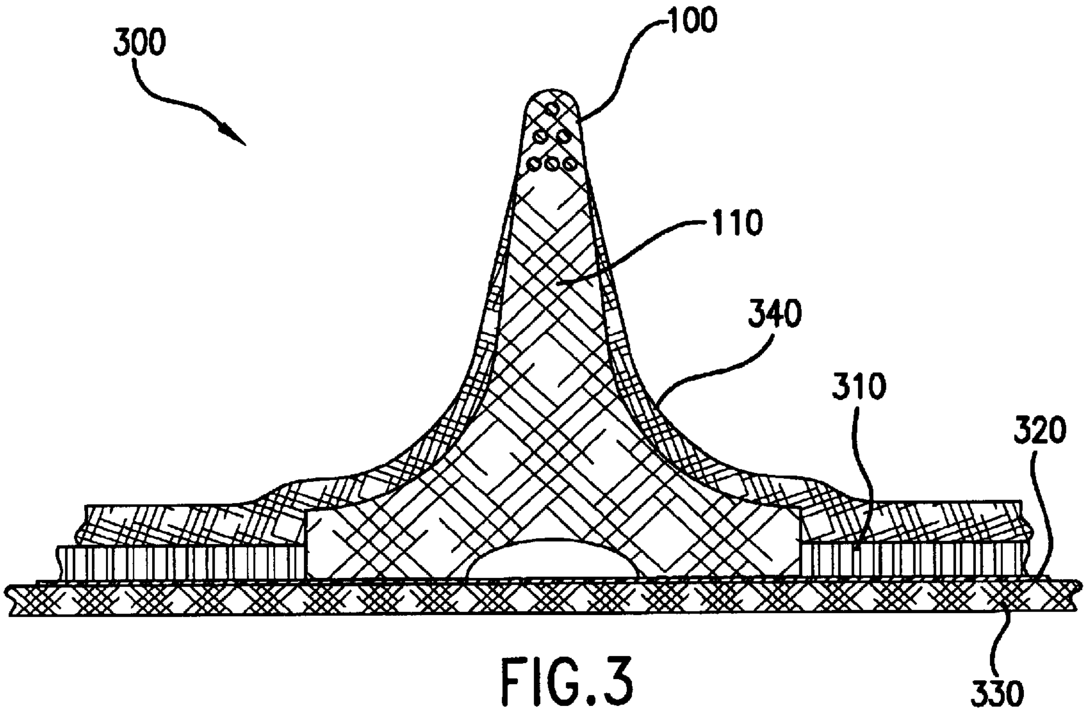
FIG. 3 is a cross sectional view of a portion of a storage tank including a rib according to a third embodiment of the present invention.

FIG. 3 is a cross sectional view of a portion 300 of a storage tank including a rib 100. First, an outer wall 330 is formed. The outer wall 330 is preferably formed of fiberglass using a female mold. To ensure watertightness, and to provide for the next stage in the construction of the tank, a flood coat of pure resin is preferably applied over the outer wall 330. While the flood coat is still tacky, a plastic film 320 is applied against the flood coat over the entire inner surface of the outer wall 330. The plastic film 320 is preferably a polyester, such as Mylar®, but any workable, thin plastic film is suitable for use in the invention. The flood coat is sufficient to hold the film 320 in place, but the film 320 will not permanently adhere to the wall 330. As described more fully in U.S. Pat. No. 5,720,404, the plastic film serves to ensure that fluid may flow between the outer wall 330 and an inner wall to be formed subsequently. (Rather than using a film 320, the inner surface of the outer wall could be manufactured with a pebbled surface or other surface that would allow liquid to pass even when another surface is placed against it.)

After the film 320 has been placed over the inner surface of the outer wall 330, a plurality of ribs 100 are installed at different points along the outer wall 330. The ribs 100 are preferably constructed in advance in a manner described below. The ribs 100 preferably have an outside diameter approximately equal to the inside diameter of the outer wall 330 and will therefore remain in place even though not attached to the film 320.

After the ribs 100 have been installed, an optional layer of three dimensional fabric 310, sometimes referred to in the art as distance fabric, is applied between the ribs 100. Examples of suitable distance fabrics include Parabeam®, a similar fabric manufactured by Vorwerk under the mark Techno-Tex, a fabric sold under the mark Syncoloop by Syncoglas S.A., and Flocore (described in U.S. Pat. No. 5,522,340), to name a few. Some of these distance fabrics such as Parabeam® can be described as a woven glass yarn fabric with two faces that are separated from each other by a plurality of columns. When the distance fabric is impregnated with resin, the columns are rigid and keep the two faces in a spaced apart relationship such that fluid can flow around the columns between the two faces. If such a fabric is used, provisions must be made to ensure that fluid communication through the annular space between the faces of the fabric and the annular space created by the plastic film 320 is established. Normally, the faces of the distance fabric will not be completely sealed by the resin and will allow the flow of fluid therethrough; however, if a face becomes oversaturated with resin to the point that it will prevent the flow of fluids therethrough, holes may be punched through the face to ensure fluid communication between the two spaces. The distance fabric is preferably load transmitting.

Next, an inner wall 340 is applied over the plastic film 320 and/or the distance fabric 310. The inner wall 340 may be comprised of the same material that comprises the outer wall 330. As shown in FIG. 3, the inner wall 340 extends only partially up the side of trunk 110 of the rib 100. This is done primarily to reduce the amount of material required to produce the tank. The only requirement is that the inner wall 340 extend over a portion of rib 100 to ensure that the rib 100 is adequately secured to the outer wall 330. Of course, the inner wall 340 could also be made to extend completely over the rib 100. After the inner wall 340 has been completed, the tank is completed in a conventional manner.

Figure 4:
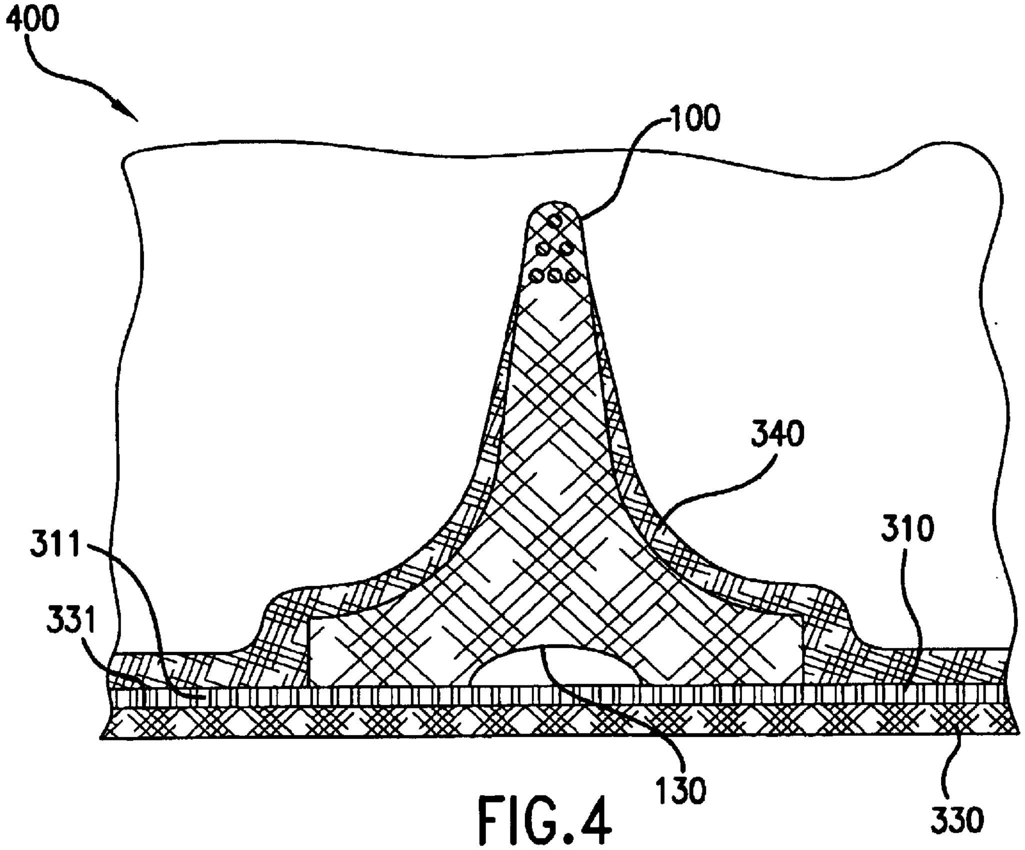
FIG. 4 is a cross sectional view of a portion of a storage tank including a rib according to a fourth embodiment of the present invention.

FIG. 4 illustrates a portion 400 of another embodiment of a tank including a high strength rib 100. In this embodiment, a distance fabric 310 is placed over the entirety of the inner surface 331 of the outer wall 330. Then, the rib 100 is positioned over the fabric 310 at various locations. The inner wall 340 is then applied over the distance fabric 310 and rib 100 and the tank is completed in a conventional manner. In this embodiment, it is not necessary for the annular space 130 to be in fluid communication with the annular space 311 created by the distance fabric 310. However, the speed with which an internal leak (in embodiments with a dry detection system) will reach a liquid detection sensor may be increased if the annular spaces 130, 311 are in fluid communication.

Figure 5:
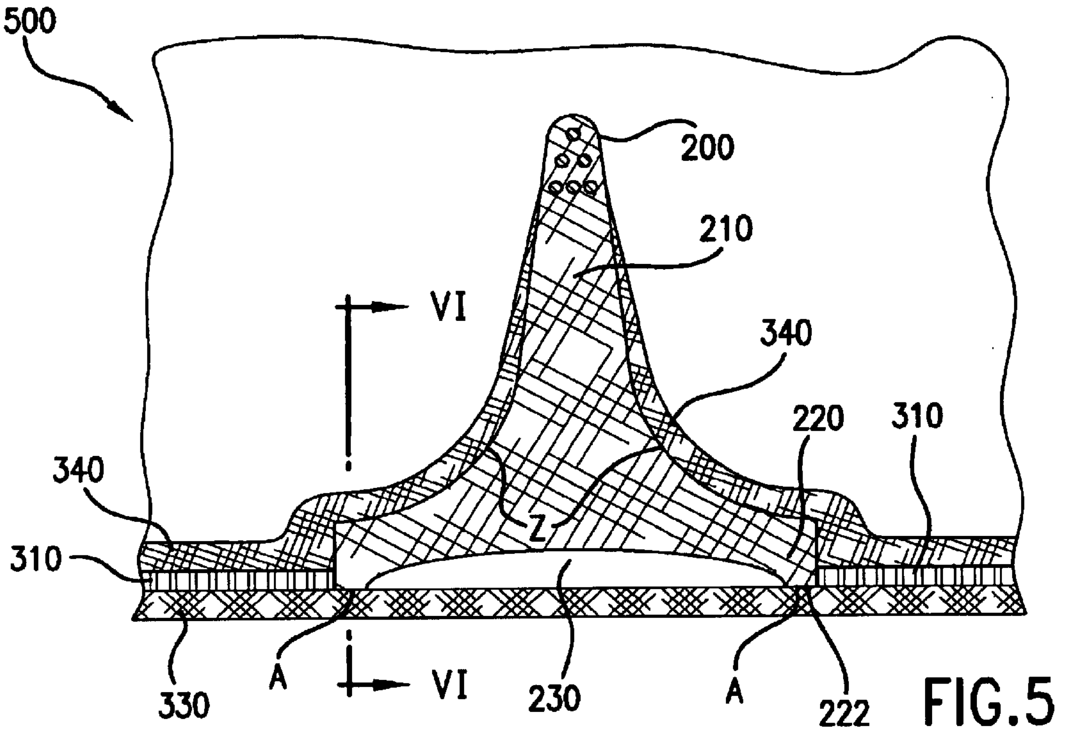
FIG. 5 is a cross sectional view of a portion of a storage tank including a rib according to a fifth embodiment of the present invention.

FIG. 5 is a cross-sectional drawing of a portion 500 of an embodiment of a tank including the high strength rib 200 discussed in connection with FIG. 2. In this embodiment, the rib 200 is installed at various locations inside of outer wall 330, preferably with a bond being formed between the outer wall 330 and the upper surfaces 222 of the branches 220 of the rib 200. Distance fabric 310 (a plastic film 320 could be used in place of distance fabric 310) is then installed between the ribs. Inner wall 340 is then formed over the distance fabric 310 and rib 200.

Figure 6:
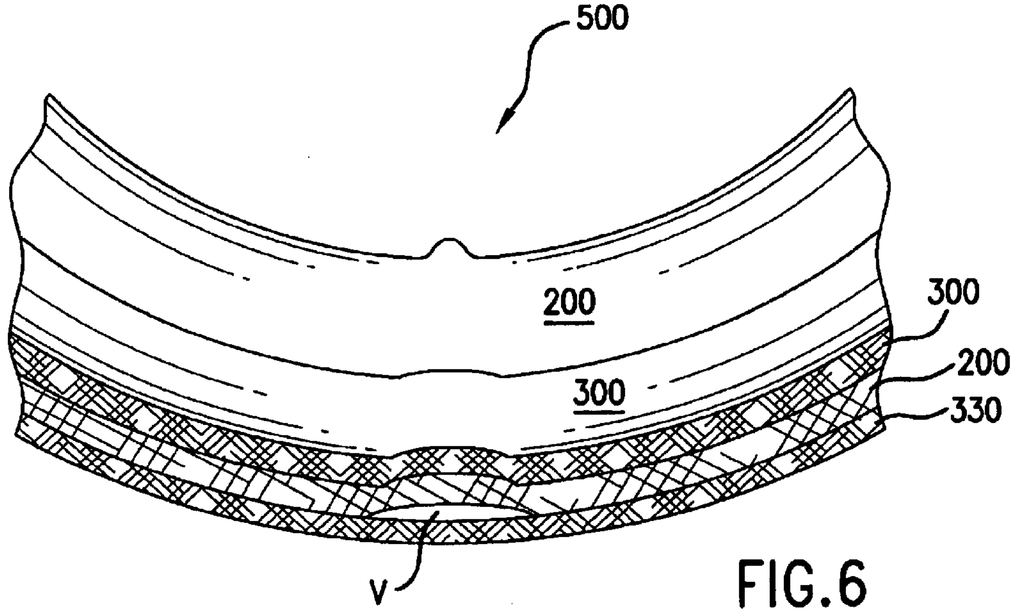
FIG. 6 is a cross sectional view of the storage tank of FIG. 5 taken along the line VI—VI.

In this embodiment, there is no fluid communication between the annular space 230 formed by the branches 220 of the rib 200 and the annular space formed by the distance fabric 310 under the branches 220 because the branches are bonded to the outer wall 330 at the points A. In order to provide fluid communication between the two annular spaces, a gutter V is formed as shown in FIG. 6. There is at least one gutter formed on the bottom of the tank 500. Other gutters may optionally be formed at other locations. The gutter V is formed by laying a strip of thermoplastic netting material (not shown in FIG. 6 but present in the gutter V), or other material that allows liquid to flow, along the length of the tank and glassing the material in, prior to the installation of the rib 200 and the fabric 310, in a manner similar to that described in U.S. Pat. No. 5,720,404. The gutter V shown in FIG. 6 is exaggerated in the drawing for illustrative purposes; in practice the gutter may be quite thin. To ensure fluid communication between the annular spaces 230 in the ribs 200 and the annular spaces in the distance fabric 310 (or plastic film 320), it may be necessary to punch holes in the distance fabric 310 (or plastic film 320) in locations over the gutter V.

Figure 7:
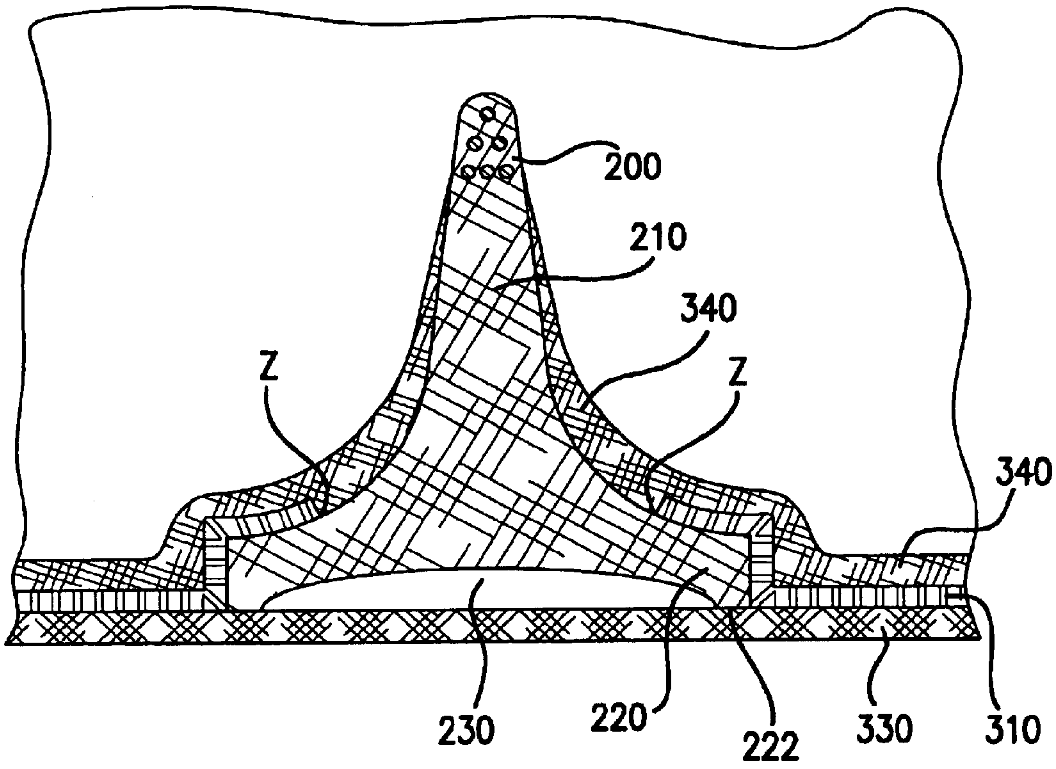
FIG. 7 is a cross sectional view of a storage tank including a rib according to a sixth embodiment of the present invention.

In the embodiment shown in FIG. 5, no annulus is present at the locations A at which the rib 200 is bonded to the outer wall 330. This may be acceptable in certain applications provided that the thickness of the upper surfaces 222 of the branches 220 is less than a specified maximum distance. In applications where this is not acceptable, the fabric 310 (or plastic film 320) may extend up over the ends of the branches 220 to a point such as points Z along the trunk 210 such that the fabric 310 (or plastic film 320) extends over the annular space 230, as shown in FIG. 7. This arrangement ensures that any normal line passing through the outer wall 330 will pass through the fabric 310 (or plastic film 320) before passing through the inner wall 340. In the embodiment shown in FIG. 5, the ribs 200 are placed in direct contact with the outer wall 330. It is readily apparent that this the rib 200 could also be placed inside an inner wall of a simple or multi walled tank. Thus, a single or multi walled tank can be prepared using a male mold and the rib 200 installed on the inner surface of the innermost wall. Because the rib 200 is installed after the walls have been formed, no collapsible male mold is necessary.

The embodiments described above all include internal ribs. It will be apparent to those of skill in the art that the manufacturing process could be modified to form tanks with external ribs rather than internal ribs.

Figure 8:
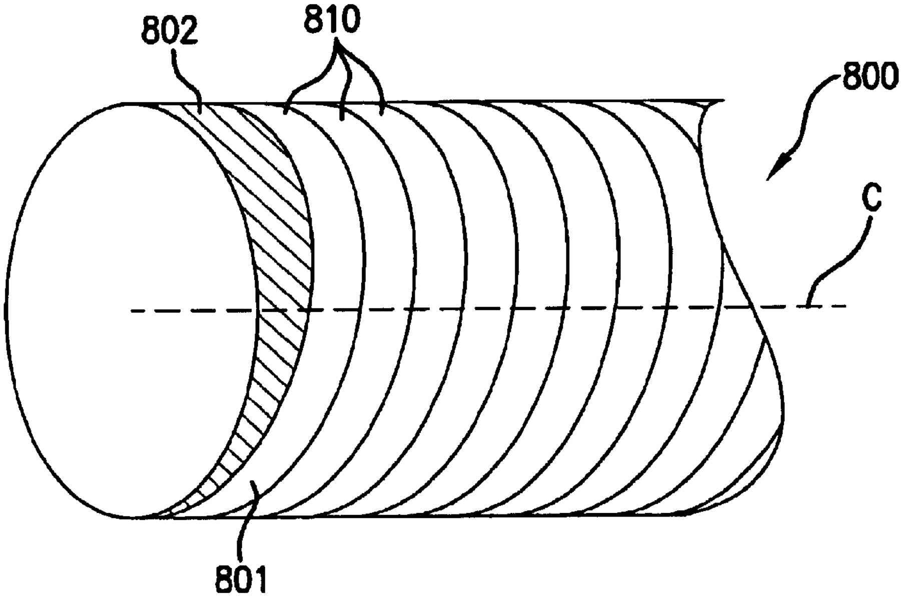
FIG. 8 is a schematic perspective view of a mold for forming a rib according to a seventh embodiment of the present invention.
Figure 9:
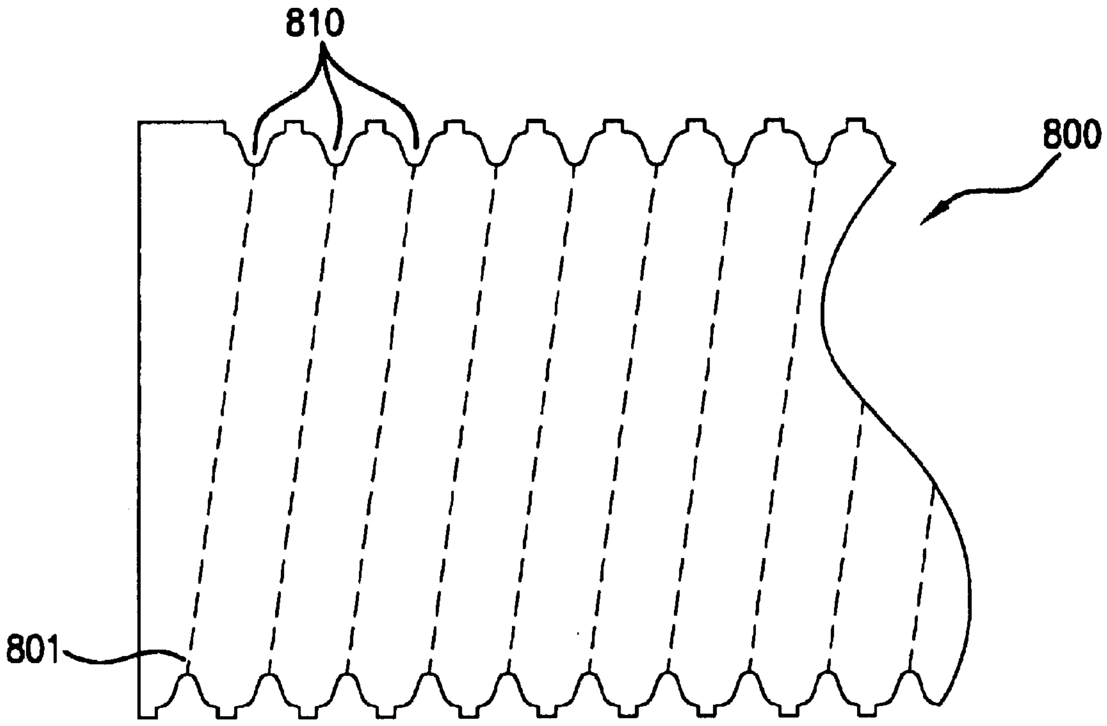
FIG. 9 is a side view of the mold of FIG. 8.

A schematic diagram for a mold 800 for producing internal high strength ribs is illustrated in FIG. 8. The mold 800 is a male mold of a generally cylindrical shape. The mold includes a single helical channel 801 that includes several turns 810 around the cylindrical body 802 of the mold 800. As shown in FIG. 9, which is a side view of the mold 800, the channel 801 has the shape of the desired rib, such as the rib 100 or 200 discussed above. In operation, material such as fiberglass chop is deposited into the mold 800 while it rotates. Reinforcing material such as graphite filaments or steel is also added during this process. When the channel 801 is nearly full, a spacer (not shown) in the shape of the annular space 130 or 230 is placed into the channel below the top of the channel. After the material has cured, it is cut along line C (shown in FIG. 8), thereby separating individual turns 801. Although not shown in FIG. 8, the mold 800 has a slot that along line C to facilitate this cutting operation. Once the cutting operation is complete, the portions of material in the channels 801 is removed from the mold 800.

Figure 10:
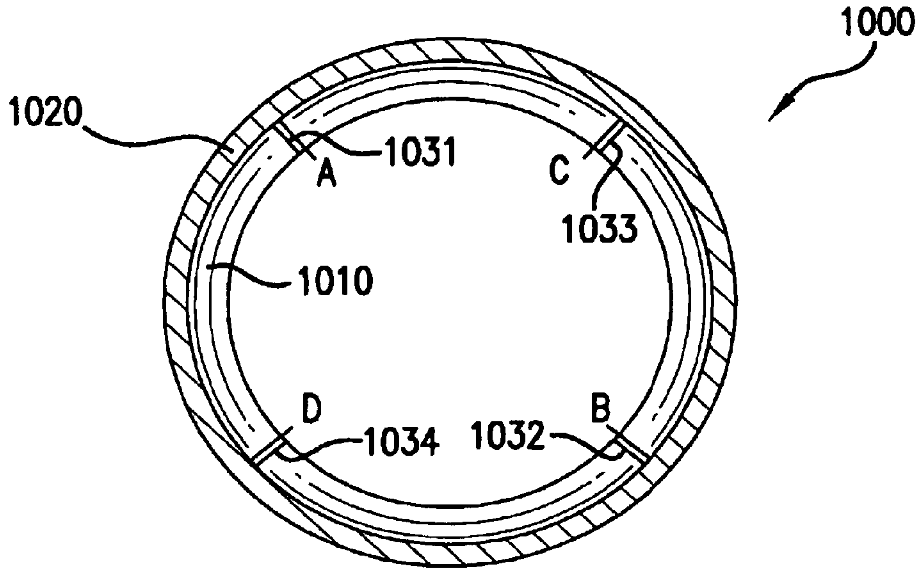
FIG. 10 is a schematic diagram showing the locations of joints of successive ribs installed in a storage tank according to the present invention.

The individual sections of material are then installed in a tank and the ends joined to form a rib. The joints of successive ribs are installed at different locations along the circumference of a tank. For example, in FIG. 10, which is a cross sectional view of a tank 1000, the ribs 1010 are installed at various locations on the inside of wall 1020 so that the joint 1031 of the first rib 1010 is at location A, the joint 1032 of the second rib 1010 is at location B, and so forth. This ensures that in the event that any joint is weaker than the other portions of the rib, no two adjacent ribs have a joint at the same angular position along the circumference of the tank 100. This increases the overall strength of the tank.

Figure 11:
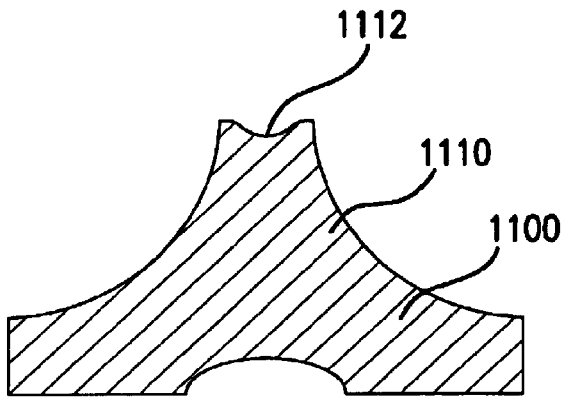
FIG. 11 is a cross sectional view of a rib according to an eighth embodiment of the present invention.
Figure 12:
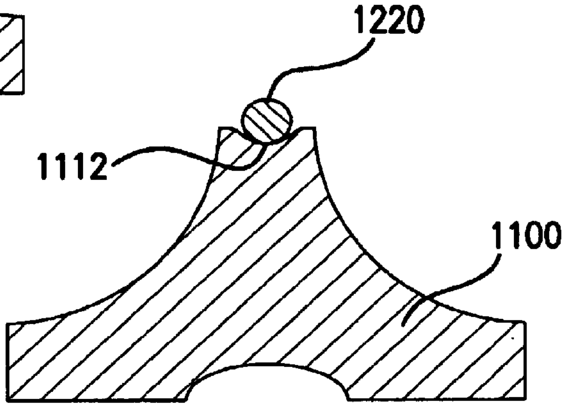
FIG. 12 is a cross sectional view of the rib of FIG. 11 including a reinforcing bar according to the present invention.
Figure 13:
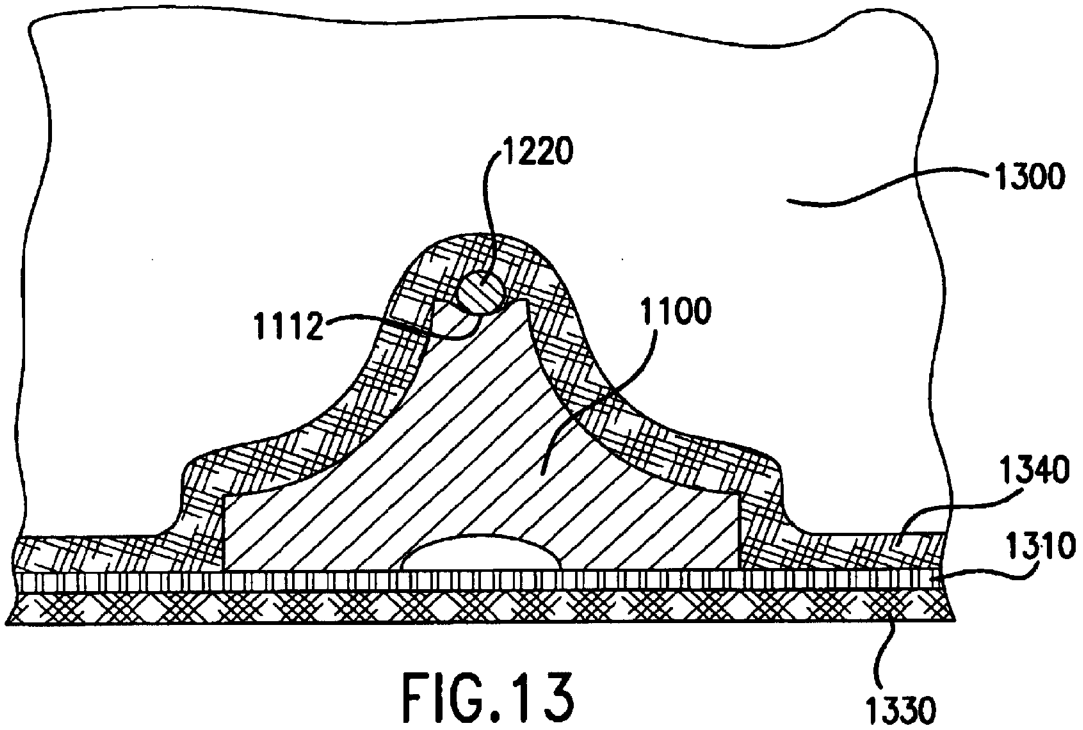
FIG. 13 is a cross sectional view of a portion of a tank according to a ninth embodiment of the present invention.

A cross sectional view of another embodiment of a high strength rib 1100 is illustrated in FIG. 11. The rib 1100 is similar to the rib 100 of FIG. 1, except that the rib body 1110 does not contain any high modulus material and has a semicircular notch 1112 at the top. The notch 1112 is sized and shaped to accept a high modulus material. In a highly preferred embodiment, the high modulus material comprises a reinforcing bar 1220 as shown in FIG. 12. The rib 1100 may be used in place of the rib 100 in the embodiment discussed above. For example, FIG. 13 illustrates a portion of a tank 1300, which is similar to the tank 400 of FIG. 4, using the rib 1100. In the tank of FIG. 13, the inner wall 1340 preferably extends completely over the rib 1100. This helps to secure the high modulus material 1220 in the notch 1112.

The embodiments of the tanks discussed above all employ internal ribs. It will be readily recognized that it is also possible to use ribs according to the present invention as external ribs as well.

Figure 14:
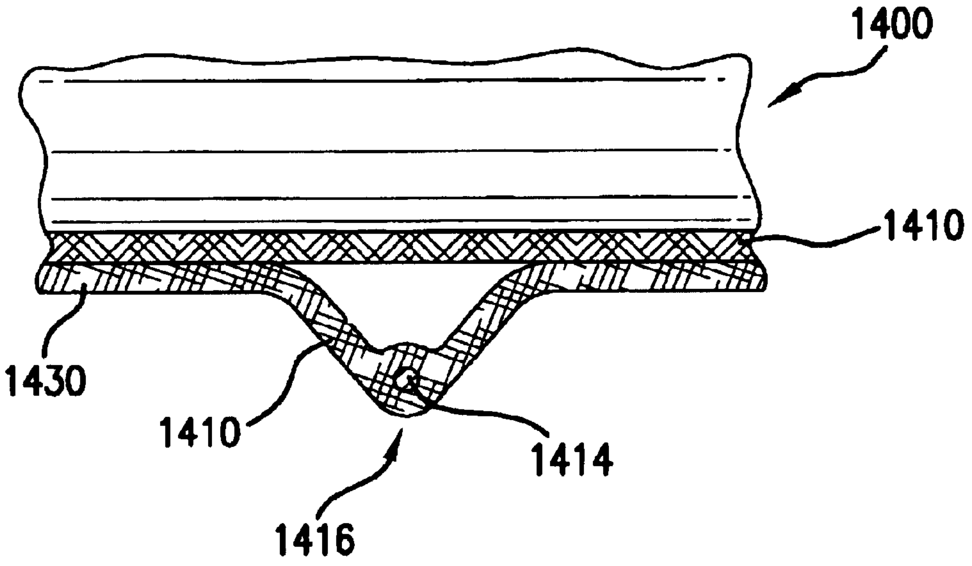
FIG. 14 is a cross sectional view of a portion of a tank according to a tenth embodiment of the present invention.
Figure 15:
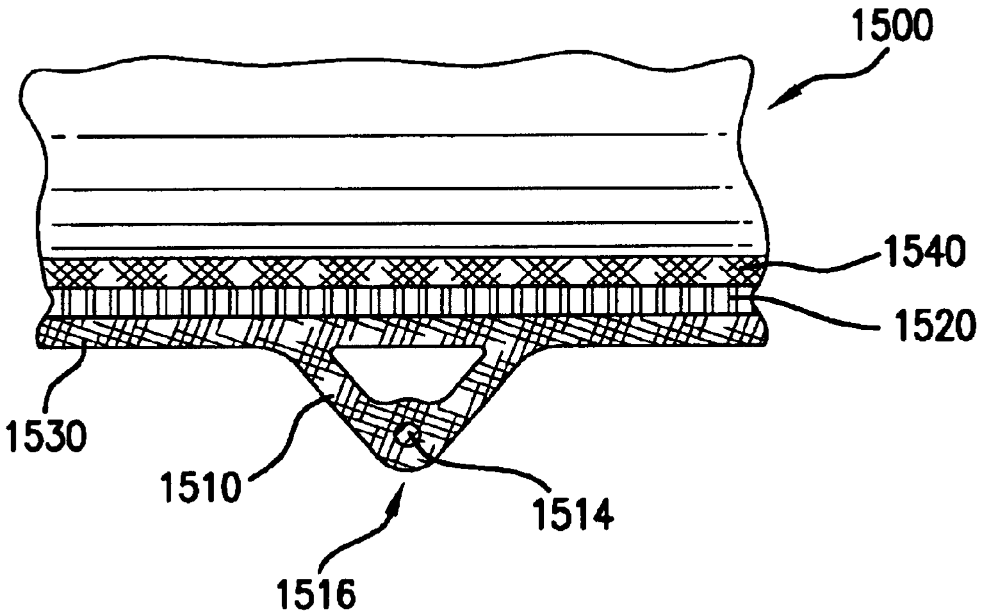
FIG. 15 is a cross sectional view of a portion of a tank according to a eleventh embodiment of the present invention.

In addition to the embodiments discussed heretofore, two additional embodiments of tanks with external ribs are illustrated in FIGS. 14 and 15. FIG. 14 illustrates a cross sectional view of portion of a tank 1400 with an external rib 1410 integrally formed with the outer wall 1430. The distal end 1416 of the rib 1410 includes reinforcing bar 1414 (or other high modulus material). As discussed previously, the inner wall 1440 and the outer wall 1430 may be separated by an annular material (not show in FIG. 14) such as Mylar®.

FIG. 15 illustrates a cross sectional view of a portion of a tank 1500 with an external rib 1510 similar to rib 1410 of FIG. 14. The tank 1500 includes a three dimensional distance fabric 1520 between the outer wall 1530 and the inner wall 1540. The rib 1510 includes reinforcing beam 1514 located in its distal end 1516. The rib 1410 and 1510 maybe formed using conventional female molding techniques.

The advantage provided by the high strength of the ribs discussed above may be utilized in different ways. The higher strength of the ribs according to the present invention allows these ribs to be constructed with smaller size as compared to known ribs of comparable strength. This provides cost and weight savings.

Alternatively, because of the higher strength of these ribs, when a tank is constructed using ribs according to the present invention that are approximately equal in size to known ribs and loadtransmitting distance fabric is present between ribs, the total number of ribs required could be decreased. The loadtransmitting distance fabric and the higher strength of the ribs work synergistically to reduce the total number of required ribs. For example, in an embodiment using loadtransmitting distance fabric with a ¼ inch thickness either between ribs such as in FIG. 3 or between and underneath ribs such as in FIG. 4, it is anticipated that only half as many ribs will be required as compared to a tank using a plastic film as the annular material. Thus, for example, in an 8 foot diameter storage tank in which distance fabric is not used and in which the rib spacing is currently 16 inches, the use of distance fabric ¼ inch thick in the manner illustrated in FIG. 3 or 4 will allow ribs to be spaced 32 inches apart; while use of distance fabric ⅜ inch thick will allow the ribs to be spaced 48 inches apart.

Obviously, numerous modifications and variations of the present invention are possible in light of the above teachings. It is therefore to be understood that within the scope of the appended claims, the invention may be practiced otherwise than as specifically described herein.

What is claimed is:

1. A storage tank comprising:

a first wall having a cylindrical shape;

a layer of annular material having a first face and a second face, the first face being adjacent to a surface of the first wall;

a rib positioned over the second face of the layer of annular material, the rib having a rib body in the shape of a hoop, the hoop having a cross section defined by a trunk section with, a proximal end and a distal end and two branch sections connected to the proximal end, the branch sections being positioned to result in the cross section being in the shape of a "Y", a length of the trunk section taken along a central line from the distal end to the proximal end being greater than a width of the trunk section, the distal end being on the interior of the hoop; and a second wall in a close spatial relationship to the first wall covering at least a portion of the rib and portions of the second face of the layer of annular material not covered by the rib;

wherein the annular material provides an annulus through which fluid may flow between the inner wall and the outer wall and underneath the rib.

2. The tank of claim 1, further comprising an alarm system including at least one sensor in fluid communication with the annulus.

3. The tank of claim 2, wherein the alarm system is a dry alarm system.

4. The tank of claim 2, wherein the alarm system is a wet alarm system.

5. The tank of claim 2, wherein the alarm system is a pressure alarm system.

6. The tank of claim 2, wherein the alarm system is a vacuum alarm system.

7. The tank of claim 2, wherein the annular material is a distance fabric.

8. The tank of claim 2, wherein the annular material is a plastic film.

9. The tank of claim 8, further comprising a layer of distance fabric between the first wall and portions of the plastic film not covered by the rib.

10. The tank of claim 2, wherein the rib body further comprises a high modulus material.

11. The tank of claim 10, wherein the high modulus material is steel.

12. The tank of claim 10, wherein the high modulus material is graphite.

13. The tank of claim 1, wherein the distal end has a notch formed therein sized and shaped to accept a high modulus material.

14. The tank of claim 13, wherein the notch has a semicircular cross sectional shape and the high modulus material is in the form of a curved rod with a circular cross sectional shape.

15. The tank of claim 13, wherein the high modulus material comprises a reinforcing bar.

16. The tank of claim 1, wherein the first wall is an outer wall of the tank.

17. The tank of claim 1, wherein the first wall is an inner wall of the tank.

18. A storage tank comprising:

a first wall having a cylindrical shape;

a rib, the rib having a rib body in the shape of a hoop, the rib body having a cross section defined by a trunk section with a proximal end and a distal end and two branch sections connected to the proximal end, the branch sections being positioned to result in the cross section being in the shape of a "Y", a length of the trunk section taken along a central line from the distal end to the proximal end being greater than a width of the trunk section, the distal end being on the interior of the hoop, each of the branches having an upper surface, the upper surface being in contact with a first surface of the first wall, a space bound by the branches and the first wall forming a rib annulus;

a layer of annular material over those portions of the first surface of the first wall not covered by the rib, the annular material forming a material annulus; and a second wall in a close spatial relationship to the first wall, the second wall covering at least a portion of the rib and portions of the annular material not covered by the rib;

wherein the tank has a gutter formed along a length of the tank, the gutter being in fluid communication with the rib annulus and the material annulus such that fluid may flow everywhere between the first wall and second wall except where an upper surface is in contact with the first wall.

19. The tank of claim 18, wherein upper surfaces of the rib are bonded to the first wall.

20. The tank of claim 18, further comprising an alarm system including at least one sensor in fluid communication with the annulus.

21. The tank of claim 20, wherein the alarm system is a dry alarm system.

22. The tank of claim 20, wherein the alarm system is a wet alarm system.

23. The tank of claim 20, wherein the alarm system is a pressure alarm system.

24. The tank of claim 20, wherein the alarm system is a vacuum alarm system.

25. The tank of claim 20, wherein the annular material is a distance fabric.

26. The tank of claim 20, wherein the annular material is a plastic film.

27. The tank of claim 20, wherein the rib body further comprises a high modulus material.

28. The rib of claim 27, wherein the high modulus material is steel.

29. The rib of claim 27, wherein the high modulus material is graphite.

30. The tank of claim 18, wherein the annular material extends at least a portion of the branches such that the annular material extends over the rib annulus.

31. The tank of claim 18, wherein the distal end has a notch formed therein sized and shaped to accept a high modulus material.

32. The tank of claim 31, wherein the notch has a semicircular cross sectional shape and the high modulus material is in the form of a curved rod with a circular cross sectional shape.

33. The tank of claim 32, wherein the high modulus material comprises a reinforcing bar.

34. The tank of claim 18, wherein the first wall is an outer wall of the tank.

35. The tank of claim 18, wherein the first wall is an inner wall of the tank.

* * * * *